(12) United States Patent
Wang et al.

(10) Patent No.: US 6,958,026 B2
(45) Date of Patent: Oct. 25, 2005

(54) SPROCKET TOOTH PROFILE

(75) Inventors: Yu Yong Wang, Singapore (SG); Gui Rong Liu, Singapore (SG); Chun Lu, Singapore (SG); Kwang Peng Quek, Singapore (SG); Yoshihisa Noguchi, Shiga (JP)

(73) Assignees: Institute of High Performance Computing, Singapore (SG); Sunstar Logistic Singapore Pte Ltd., Singapore (SG)

( * ) Notice: Subject to any disclaimer, the term of this patent is extended or adjusted under 35 U.S.C. 154(b) by 0 days.

(21) Appl. No.: 10/226,481

(22) Filed: Aug. 23, 2002

(65) Prior Publication Data

US 2003/0186766 A1   Oct. 2, 2003

(30) Foreign Application Priority Data

Mar. 27, 2002   (SG) .............................. 200201763-0

(51) Int. Cl.$^7$ ................................................ F16H 7/00
(52) U.S. Cl. ...................... 474/148; 474/156; 474/160
(58) Field of Search ............................... 474/148, 152, 474/154, 155, 156, 157, 158, 159, 160

(56) References Cited

U.S. PATENT DOCUMENTS

| | | | | |
|---|---|---|---|---|
| 4,758,209 A | * | 7/1988 | Ledvina | 474/156 |
| 4,879,920 A | * | 11/1989 | Kerkhoff | 74/465 |
| 5,397,278 A | * | 3/1995 | Suzuki et al. | 474/156 |
| 5,848,948 A | * | 12/1998 | Allen | 474/156 |
| 6,036,614 A | * | 3/2000 | Baddaria | 474/155 |
| 6,090,003 A | * | 7/2000 | Young | 474/160 |
| 6,375,589 B1 | * | 4/2002 | Makino et al. | 474/148 |

* cited by examiner

Primary Examiner—David A. Bucci
Assistant Examiner—Bradley J. Van Pelt
(74) Attorney, Agent, or Firm—Martine Penilla & Gencarella, LLP

(57) ABSTRACT

An improved tooth profile for a roller chain sprocket enables noise reduction from impact and polygonal action during the meshing process. The profile of the engaging flank consists of three portions which are the seating, impact and distal portions all three of which are arcs with well-defined radii and arc centers. The profile of the disengaging flank is determined in accordance to a modified form of the JIS standard in which the sprocket pitch is smaller than the roller chain pitch. The impact point is located at the tangent point, thus permitting a gradual change of the roller velocity, thereby lessening the impact level and the effects of polygonal action.

25 Claims, 5 Drawing Sheets

| ITEMS | EQUATIONS |
|---|---|
| $Ds$ | $Ds = 2R = 1.005 Dr + 0.076$ |
| $R$ | $R = Ds/2 = 0.5025 Dr + 0.038$ |
| $A$ | $A = 35° + 60°/N$ |
| $B$ | $B = 18° - 56°/N$ |
| $ac$ | $ac = 0.8 Dr$ |
| $Q$ | $Q = 0.8 Dr \cos(35° + 60°/N)$ |
| $T$ | $T = 0.8 Dr \sin(35° + 60°/N)$ |
| $E$ | $E = cy = 1.3025 Dr + 0.038$ |
| $xy$ | $xy = (2.605 Dr + 0.076) \sin(9° - 28°/N)$ |
| $yz$ | $yz = Dr[1.4\sin(17° - 64°/N) - 0.8\sin(18° - 56°/N)]$ |
| $G$ | $G = ab = 1.4 Dr$ |
| $K$ | $K = 1.4 Dr \cos 180°/N$ |
| $V$ | $V = 1.4 Dr \sin 180°/N$ |
| $F$ | $F = Dr[0.8\cos(18° - 56°/N) + 1.4\cos(17° - 64°/N) - 1.3025] - 0.038$ |
| $H$ | $H = \sqrt{F^2 - (1.4 Dr - Pt/2)^2}$ |
| $S$ | $S = (Pt/2)\cos 180°/N + H \sin 180°/N$ |

$N$ = tooth number   $Ds$ = seating curve diameter
$Dr$ = roller diameter   $Pt$ = sprocket pitch
$p$ = roller chain pitch   $Dp$ = pitch circle diameter

SPROCKET TOOTH PROFILE

TECHNICAL FIELD

The present invention relates generally to sprockets for use with roller chains, and more specifically to the design of a sprocket tooth profile to reduce noise. The present invention also relates to a chain-drive system incorporating at least one sprocket having the new tooth profile, as well as to a method or system for designing such a sprocket tooth profile.

BACKGROUND ART

Noise reduction has emerged as a paramount criterion in the design of roller chain drive systems in recent years. It is generally recognized that in roller chain systems, the two most significant noise sources are from the polygonal action and intensive impacts due to relative velocity between the chain rollers and sprocket teeth during their meshing process. Polygonal action is the effect of the fluctuation of the position in which the chain and sprockets engage due to the wrapping of the chain in a polygonal manner, causing both longitudinal and transverse chain span vibrations. The vibrations result in unsteady chain speeds which affect the engagement process as well as the impact levels.

The effect of impact due to relative velocity (see FIG. 1) may be thus elucidated: the drive sprocket rotates at a constant velocity, and in converting rotational power to pulling power, the rollers are seated on the sprocket teeth in turn and follow the motion of the sprocket. At the moment that a sprocket tooth engages a roller, there is an instantaneous change in the direction of roller motion, resulting in an intensive impact.

In the prior art, standard approaches to improve the noise characteristics of chain-drive systems include increasing teeth number, manipulating parameters which affect the performance of the system and improving the roller-tooth engaging mechanism. Increasing teeth number is the most direct and effective method to reduce polygonal action, especially in the case of high speed chain drives. Design parameters which are commonly manipulated are the centre distance (which controls initial tension) and inertia of sprocket. The engaging mechanism can be improved by the use of intensified lubrication, silent chains, wheel guides and the like.

The aforementioned techniques improve the noise characteristics of chain-drive systems to an extent, but there are certain limitations. For instance, increasing the number of teeth requires an increased sprocket dimension, and installation of guide wheel requires additional space. Moreover, the methods by no means always function properly. In particular, the wheel guide installed in the tight span may guide the roller to move tangentially to the pitch circle of the sprocket under certain conditions, but not always. In general, the methods of the prior art are passive, i.e. they provide remedies based on the standard tooth profile design, which is a major drawback. An active approach would be to tackle the root of the problem of noise right from the initial stage of design, such as by designing a new tooth profile to minimise impact. As will be appreciated, the term "tooth profile" herein refers generally to the two-dimensional shape or profile of the sprocket tooth in a plane substantially perpendicular to the rotational axis of the sprocket.

The design of a new teeth profile is of no easy task, since design methods have been developed for many years and are recognized by various standards, such as ISO (International Standard Organisation) standard 606:1994(E) and JIS (Japanese Industrial Standard) B 1802-1981. These are reproduced in FIGS. 3–4, respectively. Nevertheless, there is still much scope for the development of tooth profile design and the art of tooth profile design to reduce noise has been substantially researched and refined in recent years.

U.S. Pat. No. 4,758,209, to Ledvina, describes a sprocket for use with a silent timing chain wherein the sprocket is formed with an even number of teeth of which there are alternating tooth profiles.

U.S. Pat. No. 5,397,278, to Suzuki et al, describes an improved sprocket which decreases the impact between the rollers and the sprocket during meshing. The vibration noise caused by polygonal action is not addressed.

U.S. Pat. No. 6,036,614, to Baddaria, describes a symmetrical sprocket tooth with a complex profile which addresses both impact noise as well as the noise arising from polygonal action. The profile has a roller scating angle exceeding that recommended by ISO, which may be a source of problems during disengagement. Moreover, the determination of the connecting point between the seating portion and impact portion is not straightforward and the complexity in defining the profile may also be objectionable, at least to designers.

A series of patents, U.S. Pat. No. 5,921,879, U.S. Pat. No. 5,993,344, U.S. Pat. No. 6,090,003 to Young, describe a roller chain sprocket having improved noise characteristics. The underlying principle is the provision of an asymmetrical tooth space that includes a flat surface, providing a "staged" roller impact wherein a tangential impact occurs first, followed by a radial impact. Although this technique splits a single impact into two occurring at different times, both the tangential and radial impacts are nonetheless instantaneous.

Therefore, an object of the present invention is to provide an improved sprocket with reduced noise generated when used in a unidirectional roller chain drive system.

A further object of the present invention is to provide an improved sprocket with reduced roller-tooth impact by designing a new tooth profile.

SUMMARY OF THE INVENTION

According to one aspect, the present invention provides a sprocket for use with a roller chain having a succession of serially connected rollers. The sprocket comprises a plurality of teeth spaced apart around a periphery thereof for driving engagement with the rollers. At least one of those teeth, and preferably each of them, has a tooth profile that includes an engaging flank adapted to contact a roller as that roller moves into engagement with the tooth, and a disengaging flank. The engaging flank includes an impact point for initial engagement with a roller, with the impact point located on a tangent to promote a minimum initial impact and a gradual change in the velocity of the roller such that the change of velocity occurs in the tangential direction first (ie normal to the tooth surface), followed by a gradual change in the radial direction (ie parallel to the tooth surface).

The impact point is desirably located on a line tangent to a circular seating portion of the tooth profile, which tangent line intersects a centre or rotational axis of the sprocket.

The engaging flank profile preferably comprises three regions or portions which include the seating (bottom) portion, an impact (intermediate) portion and a distal (tooth top) portion. The seating portion is preferably defined by a circular arc with a radius slightly larger than that of the chain rollers. The seating portion preferably extends upwardly from the tooth root, and may actually form or define the root circle.

The impact portion is preferably defined by another arc that connects the seating portion at its tangent point from the centre of the sprocket, with the arc centre being located along the centre line of that particular tooth.

The distal portion is preferably yet another arc whose arc centre is determined by the JIS standard. The radius is determined by the end point of the impact portion that is the intersection of the impact portion and the extension of the line connecting the centres of the impact and distal portion.

According to another aspect, therefore, the present invention provides a sprocket for use with a roller chain having a succession of serially connected rollers. The sprocket comprises a plurality of teeth spaced apart around a periphery thereof for driving engagement with the rollers, at least one of said teeth (and preferably all of them) having a tooth profile including an engaging flank adapted to contact a roller as that roller moves into engagement with the tooth, and a disengaging flank, wherein the engaging flank has an impact point for initial engagement with a roller, the impact point being located on a line tangent to a circular seating portion of the tooth profile, which tangent line intersects a centre or rotational axis of the sprocket.

In a preferred embodiment of the invention, the engaging flank of the tooth profile includes an impact portion adjacent the seating portion, and a distal portion adjacent the impact portion. Each of the seating portion, impact portion and distal portion of the engaging flank profile comprises a circular arc defined by a radius and an arc centre.

In a preferred embodiment of the invention, the impact point on the engaging flank of each tooth lies above (ie radially outwardly of) a hypothetical line which joins an arc centre of the seating portion (ie pitch centre) of the respective tooth and an arc centre of the seating portion (ie pitch centre) of an adjacent tooth. The distal portion, impact portion and the seating portion of the engaging flank desirably therefore join smoothly with one another, and the impact point is located where the impact portion joins the seating portion.

In a preferred embodiment of the invention, the arc centre for the impact portion lies at the intersection of a hypothetical line which extends from the arc centre of the seating portion (ie pitch centre) of the respective tooth through the impact point, and the radial centre line of that tooth.

In a preferred embodiment of the invention, the arc centre of the distal portion is defined according to JIS standard B 1802-1981, and the distal portion preferably joins the impact portion of the engaging flank at a location where a hypothetical line which extends between the arc centre of the distal portion and the arc centre of the impact portion would intersect the circular arc of the impact portion. The circular arc of the distal portion preferably terminates at an outer circle of the sprocket.

In a preferred embodiment of the invention, the pitch of said sprocket is smaller than the pitch of said rollers, and thus pitch circle radius of the sprocket is modified to be smaller than that dictated by JIS standard B1802-1981.

The tooth profile of the sprocket according to the invention is preferably asymmetrical, and the disengaging flank is preferably designed according to JIS standard B 1802-1981 using a modified tooth root radius and the modified pitch circle radius.

According to a further aspect, the present invention provides a chain-drive system including at least one sprocket according to the invention as described generally above, and a complementary roller chain for engagement therewith. In yet another aspect, the present invention also provides a machine that includes a chain-drive system according to the invention.

According to still another aspect, the present invention provides a method of designing a sprocket tooth profile for a sprocket in a chain drive system, the sprocket tooth profile including an engaging flank adapted to contact a chain roller as that roller moves into engagement with the tooth, and a disengaging flank, the method including the steps of: determining a root circle radius for the sprocket tooth to define a circular seating portion for a roller at a base of the engaging flank profile; and defining the location of an impact point for initial engagement with a roller on a line tangent to the circular seating portion, which tangent line also intersects a centre or rotational axis of the sprocket.

In a preferred embodiment of the invention, the method further includes the step of: defining the impact point on the engaging flank of each tooth as lying above (ie radially outwardly of) a hypothetical line which joins an arc centre of the seating portion (ie pitch centre) of the respective tooth and an arc centre of the seating portion (ie pitch centre) of an adjacent tooth.

In a preferred embodiment of the invention, the method further includes the step of: defining the engaging flank of said tooth profile as having an impact portion adjacent said seating portion, and a distal portion adjacent the impact portion, each of said seating portion, impact portion and distal portion of said engaging flank profile comprising a circular arc defined by a radius and an arc centre.

In a preferred embodiment of the invention, the method further includes the step of: defining the arc centre for the impact portion as lying at the intersection of a hypothetical line which extends from the arc centre of the seating portion (ie pitch centre) of the respective tooth through the impact point, and the radial centre line of that tooth.

In a preferred embodiment of the invention, the method further includes the step of: defining the arc centre of the distal portion according to JIS standard B 1802-1981, such that the distal portion joins the impact portion of the engaging flank at a location where a hypothetical line which extends between the arc centre of the distal portion and the arc centre of the impact portion would intersect the circular arc of the impact portion.

Thus, the present invention provides a new tooth profile for a roller chain sprocket. A step-by-step methodology for defining the new profile is also-provided. Noise levels have been shown to be significantly reduced through the underlying mechanics, numerical simulation as well as prototype testing. Although the profile has been developed primarily for the drive sprocket, it is equally applicable to the driven sprocket.

The new sprocket tooth profile naturally includes both an engaging and a disengaging flank, although the present invention focuses predominantly on the engaging flank. The tooth profile according to the invention is preferably asymmetrical, with the design of the disengaging flank preferably determined according to the method stated in the JIS standard. In such a preferred embodiment the noise reduction is only unidirectional, and although the chain sprocket system may still operate in the other direction (wherein the engaging and disengaging flanks are interchanged), it does not receive any noise reduction benefits in that case.

One manner in which the present invention differs from conventional design methods is that the pitch of the sprocket of the present invention is smaller than the roller chain pitch, whereas the reverse is true for the conventional sprocket.

This is a necessary condition for a proper engagement process, as ascertained by finite element analysis.

The principle underlying such a profile is to distribute the instantaneous impact of the conventional sprocket design during the engagement over a period of time, allowing a gradual change in direction of the chain roller. The velocity of the chain roller may be resolved into two components that are radial and tangent to the tooth surface at the impact point. At the beginning of the impact duration, there is change in only the tangent direction; thereafter, the change in the tangent direction decreases, while that of the radial direction increases. A gradual overall change in velocity reduces the impact level significantly and leads to a noise reduction. A new tangent point is herein defined, and by establishing the impact point at the tangent point, or at least near it, the velocity change is minimised for the initial impact.

Thus, an advantage of the present invention is the provision of a tangent point as the impact point, allowing a minimum initial impact and a gradual change in the velocity of the chain roller during engagement, resulting in reduced impact and noise reduction.

Another advantage of the present invention is that the chain roller impacts the sprocket tooth at the tangent point first, and then falls downwards onto the seating portion gradually, thereby reducing the polygonal action and vertical vibrations of the chain.

Yet another advantage of the present invention is that the engaging flank preferably consists of three arcs with arc centres which may be determined in a straightforward manner, thereby facilitating the ease of design and manufacture.

Yet still another advantage of the present invention is the full contact of the roller and the seating portion along the curvature after engagement, thus allowing slight dimensional tolerances, leading to a reduction in broad-band mechanical noise caused by dimensional inaccuracies.

The above and further features and advantages of the present invention will become apparent to those skilled in the art from the following detailed description of the invention when taken in conjunction with the accompanying drawings.

BRIEF DESCRIPTION OF THE DRAWINGS

The above and further features and advantages of the present invention will be more fully appreciated from the following detailed description of preferred embodiments of the invention with reference to the accompanying drawings, in which like reference characters indicate like parts, and in which.

DETAILED DESCRIPTION OF THE INVENTION

Figure 1:
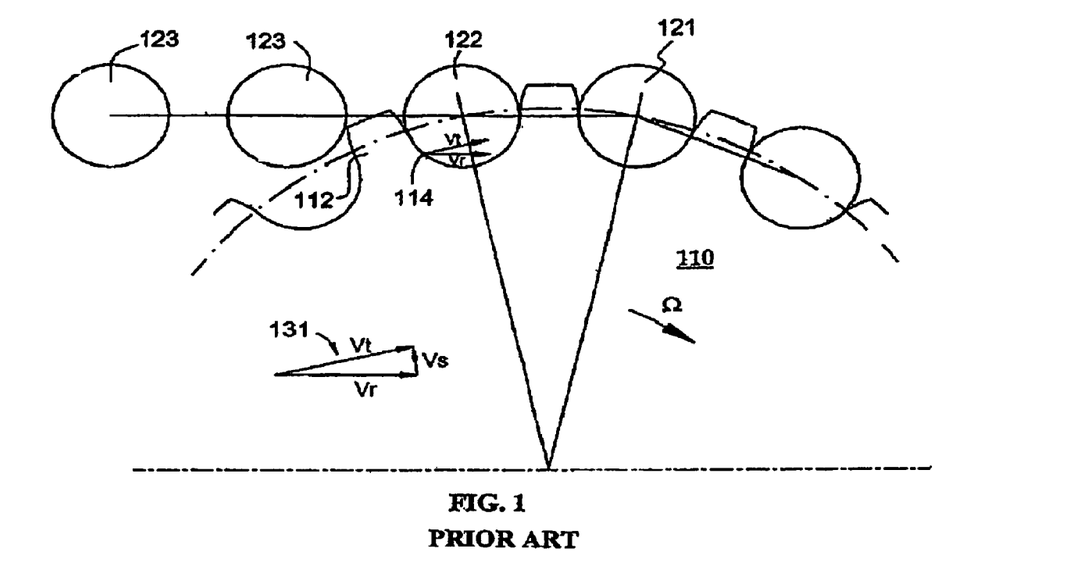
FIG. 1 illustrates the engagement process for a conventional chain sprocket system.

Reference is now made to FIG. 1, which illustrates the engagement process for a conventional chain sprocket system. A drive sprocket 110 rotates at a constant velocity Ω and each point on the sprocket moves along its tangential direction. Fully seated rollers 121 follow the motion of the sprocket teeth 112. Rollers 123 which are not yet engaged move at a roller velocity Vr. A roller 122 is at the point of engagement with a sprocket tooth 112, impacting at an impact point 114. Immediately after impact, the roller velocity Vr changes to coincide with the tooth velocity Vt of the sprocket tooth 112 at the impact point 114. Thus, there is a change in velocity, Vs, which is the result of a sudden impact. It is useful to depict this relationship in a closed vector polygon 131.

Figure 2:
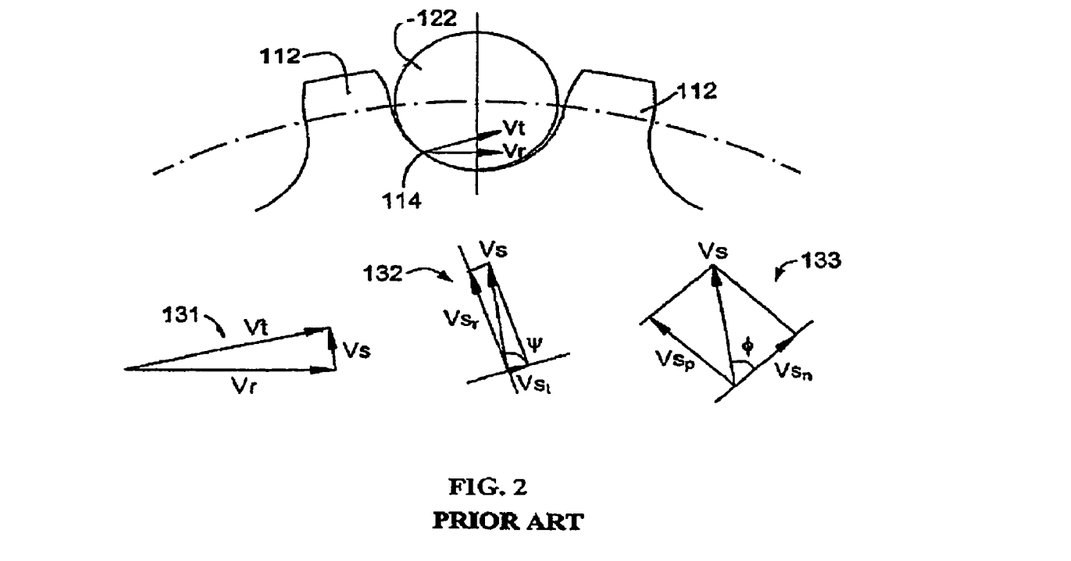
FIG. 2 shows an enlarged view of the engaging roller and sprocket tooth together with the components of the velocity change.

Reference is now made to FIG. 2, which shows an enlarged view of the engaging roller and sprocket tooth, as well as the components of the change in velocity Vs One method of resolving the vector Vs is shown in a vector diagram 132, which are in the radial and tangential direction with respect to the sprocket centre, denoted by $Vs_r$ and $Vs_t$ respectively. The angle which the component $Vs_t$ makes with $V_s$ is further denoted by $\psi$. Another method, as shown in another vector diagram 133, uses the tooth profile gradient at the impact point 114 as reference. The component normal to the tooth profile is denoted by $Vs_n$. The component with the perpendicular to the normal direction is denoted by $Vs_p$, hereinafter referred to as the perpendicular direction for simplicity. The use of "tangential direction" is avoided here to avert an ambiguity in nomenclature since this term is strictly reserved for $Vs_t$ in the vector diagram 132. The angle between $Vs_n$, and Vs is further denoted by $\phi$. It is apparent that $\phi$ is a function of the tooth profile gradient at the impact point, whereas $\psi$ is independent of the gradient and is constant for a given impact point. When the tooth surface gradient at impact point 114 is aligned in the radial direction, $\phi$ and $\psi$ are equal and the vector diagrams 132 and 133 are coincident.

For the conventional sprocket design, $Vs_n$ and $Vs_p$ occur virtually simultaneously, resulting in a large impact. Hitherto, there have been attempts to stagger the impacts into two stages, as disclosed in U.S. Pat. No. 5,993,344 by Young. The drawback to such an approach is that each of the two stages consists of a distinct impact of a very short impact time. A more gradual change in normal and perpendicular velocity over a prolonged impact time will reduce the impact noise more significantly. The present invention is directed towards this task by describing an improved tooth profile.

The new profile should meet the following basic requirements, which will then be elaborated:

Continuous curvature of the tooth profile

Standards on tooth profile design, namely the ISO and JIS standards

Minimum tooth shape to allow engagement and disengagement of the roller with the sprocket.

A continuous curvature is essential to maintain a smooth contact between the roller and tooth without inducing additional impacts. Kinks must be avoided, especially between the different sections of the profile.

Figure 3:
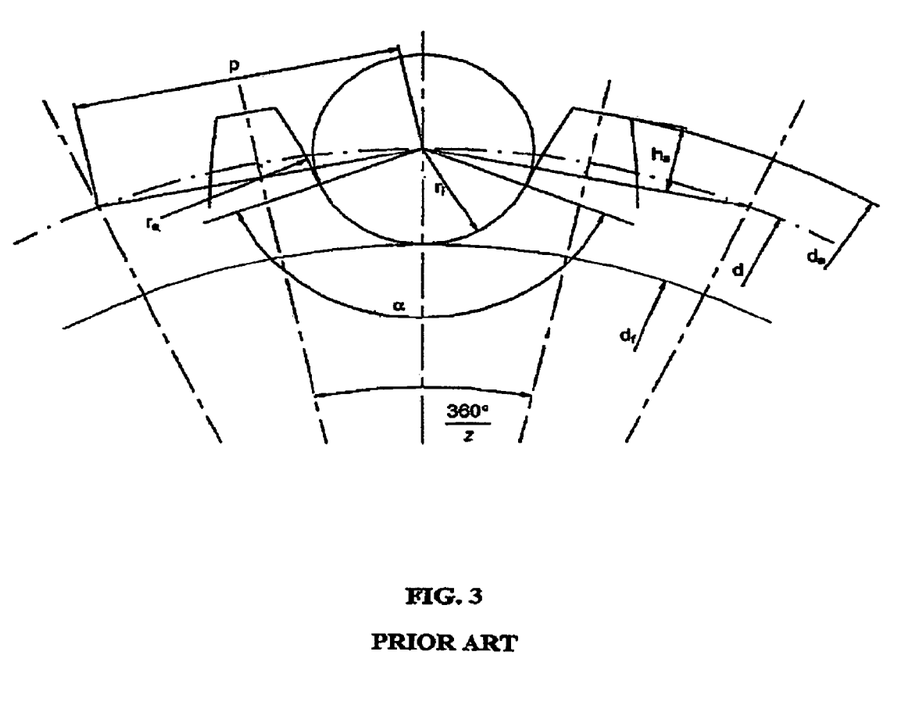
FIG. 3 shows the tooth profile and some of the design parameters according to the ISO-606 standard.

FIG. 3 shows the ISO standard. Of specific interest to the present invention is the roller seating angle, α, which should lie within the limits:

$120°-(90°/Z)<\alpha<140°-(90°/Z)$, where Z is the teeth number.

The upper bound is imperative to ensure a proper engaging and disengaging mechanism.

Figure 4:
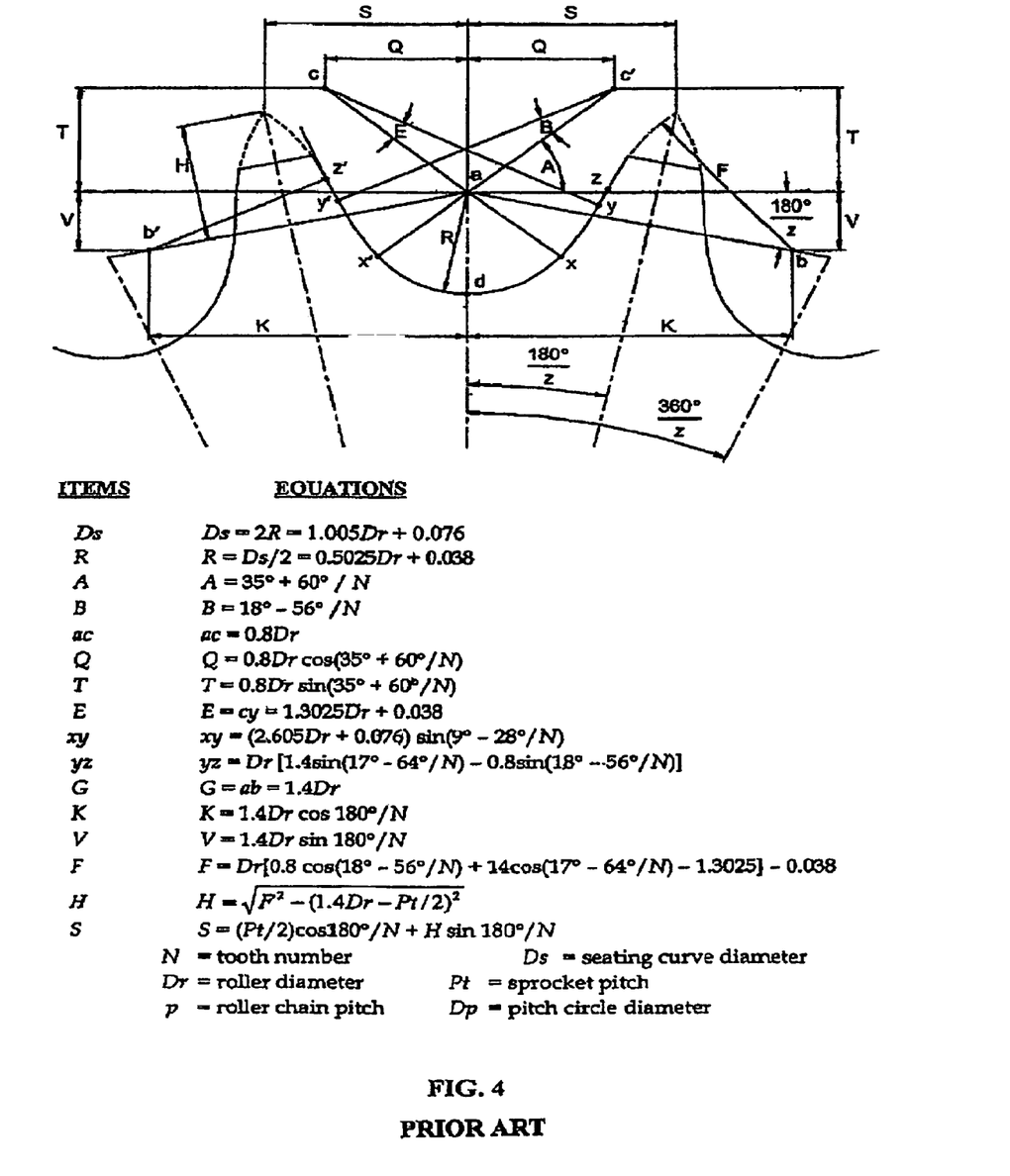
FIG. 4 shows the "S" type tooth profiles and the design parameters for a JIS compliant roller chain sprocket.

FIG. 4 shows the JIS standard, with the diagram and equations being hereby reproduced. The tooth profile of the present invention is founded primarily on the JIS standard. In particular, the disengaging flank profile follows a modified form of the JIS standard. Aspects in which the two differ will be pointed out subsequently, while FIG. 5 facilitates a visual comparison between the JIS standard and the new profile.

Figure 6:
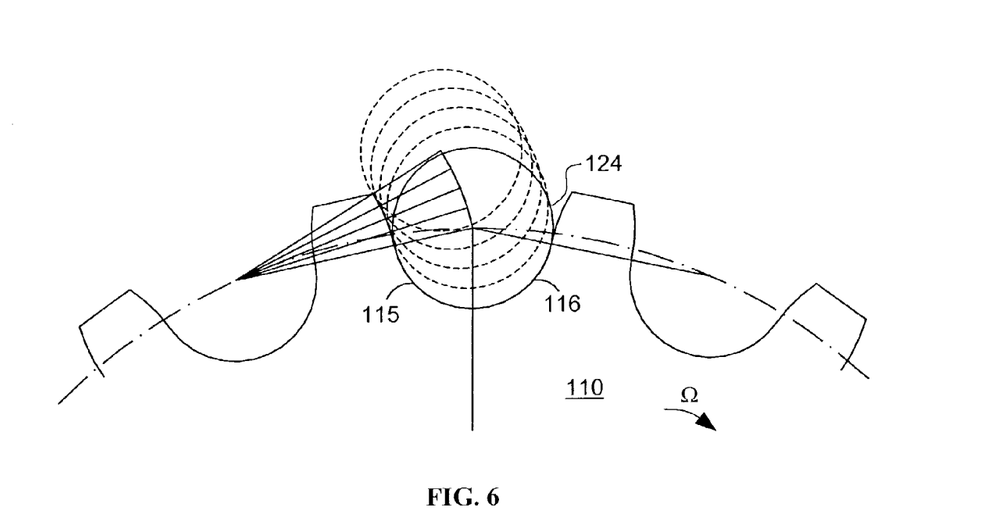
FIG. 6 shows the ideal limits of the tooth profile shape assuming that the sprocket tooth and roller chain are rigid bodies.

Reference is now made to FIG. 6, which shows the ideal case of the limits of the tooth profile shape in which the sprocket 110 and chain rollers are treated as rigid bodies, The dotted circles depict the motion of a roller 124 of relative position to the sprocket 110 as the roller 124 moves outwards during disengagement. This imposes a constraint on the profile of the engagement flank 115, since the route of the roller 124 will be obstructed should the limiting profile shape be exceeded. Similarly, a limiting profile for the disengaging flank 116 exists for proper engagement, which is a mirror image of FIG. 6 about the vertical axis. The latter constraint is of lesser relevance to the profile of the invention, since the disengaging flank 116 follows the JIS standard closely.

Having laid down the key requisites, a discussion of the design considerations is now in order. Reference is now made back to FIG. 2. It is apparent that at the exact instant of initial impact at impact point 114, assuming an ideal frictionless scenario, there is only the $Vs_n$ component (in practice friction will attribute to $Vs_p$, but the latter is much smaller in magnitude) which is the main contribution to impact noise. Thereafter, the roller 122 "rolls" downwards slightly to a lower point and the contact point changes. At this moment, the direction of Vt would have shifted due to the rotation of the sprocket Vr would also have changed. The process is repeated until the roller 122 is fully seated such that Vr and Vt are equal. For the conventional sprocket design, the entire duration is very short. In practice, owing to dimensional tolerances and uncertainties in the engagement mechanism, impact does not always occur at the design impact point 114, which only adds to the complexity of the engaging process. It suffices to construe that impact noise can be limited by minimising $Vs_n$, although the detailed mechanism cannot be described this simply.

Figure 7:
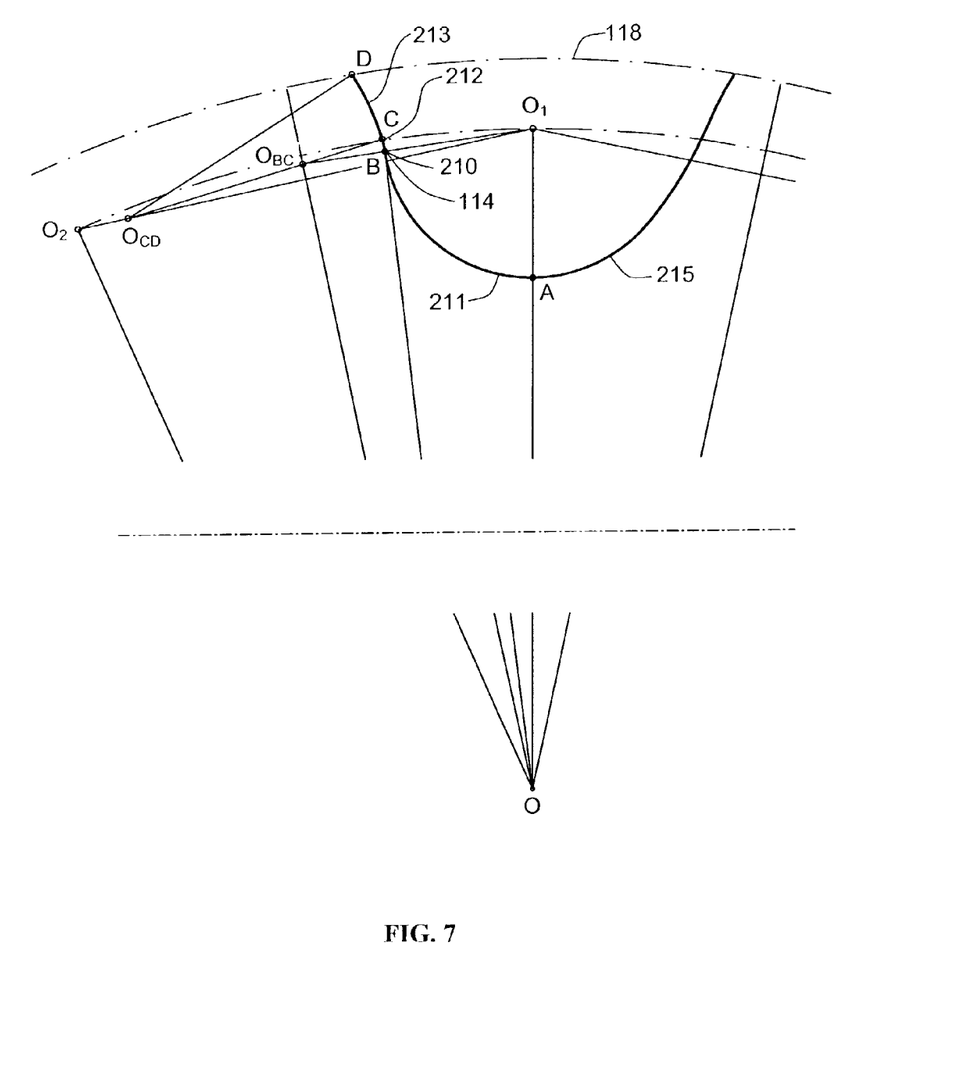
FIG. 7 illustrates a new sprocket tooth profile according to a preferred embodiment of the present invention.

Reference is now made to FIG. 7, which shows the new profile of the present invention. The profile of the engaging flank comprises three distinct portions; namely, a seating (bottom) portion 211, an impact (intermediate) portion 212 and a distal (tooth top) portion 213. The seating portion 211 is an arc AB of root radius R and centre $O_1$, the impact portion 212 is another arc BC of radius $O_{BC}C$ and centre $O_{BC}$, while the distal portion 213 is yet another arc CD of radius $O_{CD}C$ and centre $O_{CD}$.

The fundamental idea for the improved profile emanates from the concept of changing the velocity gradually by minimising $Vs_n$. It is apparent to those skilled in the art that $Vs_n$ is minimised when the tooth profile gradient at the impact point 114 is aligned in the radial direction such that φ equals ψ. This is achieved by establishing the impact point 114 at a tangent point 210 at B, defined by taking a line passing though the centre of sprocket O touching the arc AB. In the prior art, the impact point and hypothetical tangent point arc not necessarily coincidental. In practice, the impact point 114 cannot be predicted with certainty owing to dimensional tolerances, inter alia, but it should be consistently close to the tangent point 210.

The initial impact sees a change of velocity in the tangential (also normal to the tooth surface) direction first, followed by a gradual change in the radial (also parallel to the tooth surface) direction. As the direction of initial impact $Vs_n$ is coincident with Vt, there is constraint to the roller only tangentially, and not in the radial direction. The roller is allowed to "roll" into the seating position gradually over a prolonged impact duration, thus lessening the impact noise. It transpires that there is an added benefit of reducing transverse vibrations due to polygonal action.

The design of the profile beyond the impact point 114 is constrained by two conflicting requirements. On the one hand, there is a limiting profile which may not be exceeded lest the disengaging mechanism is impeded. On the other hand, a continuous curvature will result in the profile being exceeded, at least if conventional design approaches are applied. These requirements are found to be satisfied by provision of an arc BC at the impact portion instead of a straight line.

The sprocket pitch to roller chain pitch ratio for the present invention differs from the conventional design. For the conventional design, the impact point 114 is located below the line $O_1, O_2$ connecting the two adjacent pitch centres. Thus, the sprocket pitch should be slightly longer than the roller chain pitch to account for the tensile deformation in the roller chain, Conversely, for the new design, the impact point is now located above the line $O_1, O_2$, which means that the sprocket pitch becomes too large and should be less than the roller chain pitch so that they can match each other during the engaging process. As a corollary, the pitch cycle radius $O, O_1$, will be smaller than the JIS standard to accommodate the smaller sprocket pitch.

The disengaging flank 215 follows a modified JIS standard using a modified tooth root radius and a reduced pitch cycle radius. There is little necessity for further modifications since impact is not considered during disengagement, and a symmetrical profile based on the new profile only interferes with the engaging process. The asymmetrical profile of the present invention is thus able to exploit favourable aspects of the engaging and disengaging flank design. For instance, the ISO standard on the maximum roller seating angle α need not be conformed to in the new asymmetrical profile.

The methodology for the new profile design is outlined herein below as a step-by-step procedure:

1. Draw pitch circle with radius $R_p'=R_p-\Delta R$, where $\Delta R$ is determined from the tooth radius R and roller radius $R_r$.
2. Draw a circle with tooth root radius R and the centre at $O_1$, where R is slightly larger than the roller radius $R_r$. [See, for example, FIG. 7 in which $R=O_1A=1.01R_r+0.065(2R_r)^{1/3}$]
3. Find the tangent line OB of the above circle to determine the tangent point B.
4. Plot line $O_1$ B and extend it to intersect with tooth centre line $OO_{BC}$ at $O_{BC}$
5. Draw an arc with radius $O_{BC}B$ and centre at $O_{BC}$.
6. Determine point $O_{CD}$ according to JIS standard.
7. Plot line $O_{CD}O_{BC}$ and extend it to intersect with above curve BC at the point C.
8. Draw arc with radius $O_{CD}C$ and centre at $O_{CD}$ with the arc intersecting with the outer circle 118 at point D.
9. Determine the profile of the disengaging flank 215 according to the modified JIS standard in which sprocket pitch is smaller than roller chain pitch.

Figure 5:
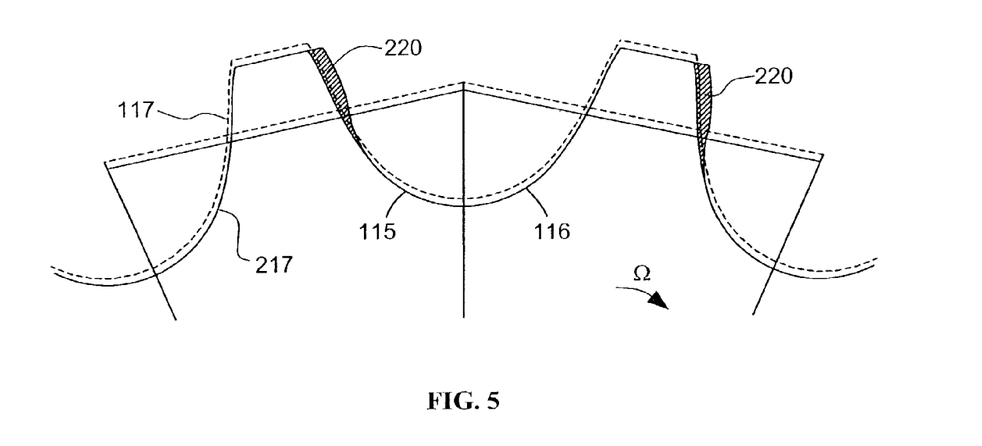
FIG. 5 is a pictorial comparison of the tooth profile according to a preferred embodiment of the present invention and the JIS standard.

Reference is now made back to FIG. 5, which gives a pictorial comparison of the new profile and JIS standard, and which is useful to distinguish the key characteristics of the new profile. Dotted lines are used for the JIS profile 117, while solid lines represent the modified JIS profile 217 The primary distinction of the new profile is the addition of a portion 220 to the engaging flank 115 of the modified JIS profile 217. There is little modification to the profile of the disengaging flank 116.

Thus, a new and improved tooth profile for a sprocket has been described which reduces noise during the meshing process, and this has been corroborated by finite element analysis, as well as by prototype testing. The experimental results showed that the particular sprocket tested having the new and improved tooth profile of the invention reduced the system noise from a level of 90.82 dB to a level of 86.33 dB. This represents an approx. 5% reduction in system noise.

Although a specific methodology for drawing the tooth profile has been described, it is possible to make modifications to that methodology without departing from the spirit of the invention. For example, the arc centre $O_{CD}$ of the distal portion may be located by means apart from JIS standard, since a slight shift in the location of $O_{CD}$ is not deemed to have any significantly effects on the noise reduction mechanism.

Accordingly, it will be understood that various alterations and/or additions in the particular construction and arrangement of sprocket and chain-drive system of the invention previously described may be made without departing from the spirit or ambit of the present invention as defined in the appended claims.

What is claimed is:

1. A sprocket for use with a roller chain having a succession of serially connected rollers, said sprocket comprising:
a plurality of teeth spaced apart around a periphery thereof for driving engagement with the rollers, at least one of said teeth having a tooth profile including an engaging flank adapted to contact a roller as that roller moves into engagement with said at least one tooth, and a disengaging flank; wherein said engaging flank has an impact point at initial engagement with a roller, said impact point being located on a line tangent to a circular seating portion of the tooth profile, which tangent line intersects a center or rotational axis of the sprocket.

2. A sprocket according to claim 1, wherein the engaging flank of said tooth profile includes an impact portion adjacent said seating portion, and a distal portion adjacent the impact portion, each of said seating portion, impact portion and distal portion of said engaging flank profile comprising a circular arc defined by a radius and an arc center.

3. A sprocket according to claim 1 or claim 2, wherein the impact point on the engaging flank of each tooth lies above a hypothetical line which joins an arc center of the seating portion of the respective tooth and an arc center of the seating portion of an adjacent tooth.

4. A sprocket according to claim 2, wherein the distal portion, impact portion and the seating portion of the engaging flank join smoothly with one another.

5. A sprocket according to claim 2, wherein the impact point is located where the impact portion joins the seating portion.

6. A sprocket according to claim 2, wherein the arc center for the impact portion lies at the intersection of a hypothetical line which extends from the arc center of the seating portion of the respective tooth through the impact point, and the radial center line of that tooth.

7. A sprocket according to claim 2, wherein the distal portion joins the impact portion of the engaging flank at a location where a hypothetical line which extends between the arc center of the distal portion and the arc center of the impact portion would intersect the circular arc of the impact portion.

8. A sprocket according to claim 7, wherein the circular arc of the distal portion terminates at an outer circle of the sprocket.

9. A sprocket according to claim 1, wherein the pitch of said sprocket is smaller than the pitch of said rollers.

10. A sprocket according to claim 9, wherein the tooth profile is asymmetrical, and the disengaging flank is designed using a modified tooth root radius and a pitch circle radius of said sprocket.

11. A sprocket for use with a roller chain having a succession of serially connected rollers, said sprocket comprising:
a plurality of teeth spaced apart around a periphery thereof for driving engagement with the rollers, at least one of said teeth having a tooth profile including an engaging flank adapted to contact a roller as that roller moves into engagement with said at least one tooth, and a disengaging flank; wherein said engaging flank includes an impact point at initial engagement with a roller, said impact point being located on a tangent to promote a minimum initial impact and a gradual change in the velocity of said roller such that said change of velocity in the tangential direction first, followed by a gradual change in the radial direction; and
wherein said engaging flank includes a seating portion, an impact portion and a distal portion, each of said seating, impact and distal portions comprising a circular arc defined by a radius and an arc center, and wherein the impact point is located in the impact portion of the engaging flank at a tangent to the circular arc of the seating portion, which tangent intersects a center or rotational axis of the sprocket.

12. A sprocket according to claim 11, wherein the impact point on the engaging flank of each tooth lies above a hypothetical line which joins the arc center of the seating portion of the respective tooth and the arc center of the seating portion of an adjacent tooth.

13. A sprocket according to claim 11, wherein the distal portion, impact portion and the seating portion of the engaging flank join smoothly, preferably tangentially, with one another.

14. A sprocket according to claim 11, wherein the arc center for the impact portion lies at the intersection of a hypothetical line which extends from the arc center of the seating portion of the respective tooth through the impact point, and the radial center line of that tooth.

15. A sprocket according to claim 11, wherein the distal portion joins the impact portion of the engaging flank at a location where a hypothetical line which extends between the arc center of the distal portion and the arc center of the impact portion would intersect the circular arc of the impact portion.

16. A sprocket according to claim 15, wherein the circular arc of the distal portion terminates at an outer circle of the sprocket.

17. A sprocket according to claim 12, wherein the pitch of said sprocket is smaller than the pitch of said rollers.

18. A sprocket according to claim 17, wherein the tooth profile is asymmetrical, and the disengaging flank is designed using a modified tooth root radius and a pitch circle radius of said sprocket.

19. A chain-drive system including at least one sprocket according to claim 1 or claim 11, and a complementary roller chain for engagement therewith.

20. A machine having a chain-drive system according to claim 19.

21. A method of designing a sprocket tooth profile for a sprocket in a chain drive system, the sprocket tooth profile including an engaging flank adapted to contact a chain roller as that roller moves into engagement with the tooth, and a disengaging flank, the method including the steps of:
   determining a root circle radius for the sprocket tooth to define a circular seating portion for a roller at a base of the engaging flank profile; and
   defining the location of an impact point at initial engagement with a roller on a line tangent to the circular seating portion, which tangent line also intersects a center or rotational axis of the sprocket.

22. A method according to claim 21, further including the step of:
   defining the impact point on the engaging flank of each tooth as lying above a hypothetical line which joins an arc center of the seating portion of the respective tooth and an arc center of the seating portion of an adjacent tooth.

23. A method according to claim 22, further including the step of:
   defining the engaging flank of said tooth profile as having an impact portion adjacent said seating portion, and a distal portion adjacent the impact portion, each of said seating portion, impact portion and distal portion of said engaging flank profile comprising a circular arc defined by a radius and an arc center.

24. A method according to claim 23, further including the step of:
   defining the arc center for the impact portion as lying at the intersection of a hypothetical line which extends from the arc center of the seating portion of the respective tooth through the impact point, and the radial center Line of that tooth.

25. A method according to claim 24, further including the step of:
   defining the arc center of the distal portion such that the distal portion joins the impact portion of the engaging flank at a location where a hypothetical line which extends between the arc center of the distal portion and the arc center of the impact portion would intersect the circular arc of the impact portion.

* * * * *